(12) United States Patent
Lee

(10) Patent No.: US 12,275,401 B2
(45) Date of Patent: Apr. 15, 2025

(54) TRAFFIC LIGHT RECOGNITION-BASED SCC CONTROL APPARATUS AND METHOD

(71) Applicant: HYUNDAI MOBIS CO., LTD., Seoul (KR)

(72) Inventor: Jae Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 199 days.

(21) Appl. No.: 18/146,190

(22) Filed: Dec. 23, 2022

(65) Prior Publication Data

US 2023/0202474 A1 Jun. 29, 2023

(30) Foreign Application Priority Data

Dec. 27, 2021 (KR) .................. 10-2021-0188621

(51) Int. Cl.
*B60W 30/14* (2006.01)
*G06T 7/20* (2017.01)
(Continued)

(52) U.S. Cl.
CPC ............. *B60W 30/143* (2013.01); *G06T 7/20* (2013.01); *G06T 7/50* (2017.01); *G06V 10/26* (2022.01);
(Continued)

(58) Field of Classification Search
CPC ......... B60W 30/143; B60W 2420/403; B60W 2554/404; B60W 2555/60; B60W 30/181; B60W 40/02; B60W 60/001; B60W 2520/04; B60W 2530/13; B60W 2552/40; B60W 2554/802; G06T 7/20; G06T 7/50; G06T 2207/30252; G06T 2207/20084; G06T 7/73; G06V 10/26; G06V 10/56;
(Continued)

(56) References Cited

U.S. PATENT DOCUMENTS

2019/0389465 A1* 12/2019 Ogino ..................... B60T 7/22
2020/0139969 A1*  5/2020 Jo ........................ G08G 1/0968
(Continued)

FOREIGN PATENT DOCUMENTS

KR 10-1743389 6/2017

OTHER PUBLICATIONS

English Language Abstract of KR 10-1743389 published Jun. 7, 2017.

*Primary Examiner* — Tyler D Paige
(74) *Attorney, Agent, or Firm* — DLA PIPER LLP US

(57) ABSTRACT

A traffic light recognition-based smart cruise control (SCC) control apparatus and method. The apparatus includes an image-capturing unit configured to capture a front-side image of a vehicle, and a controller configured to classify at least one traffic light in the front-side image, calculate a distance to each classified traffic light, if there are a plurality of traffic lights having different distances in the front-side image, recognize a first signal of a first traffic light closest to the vehicle and a second signal of a second traffic light located next to the first traffic light, if the first signal is a driving signal and the second signal is a stop signal, calculate an acceleration time, and control the vehicle to be accelerated and traveled during the acceleration time, and then stopped before the second traffic light by using frictional force.

18 Claims, 10 Drawing Sheets

(51) Int. Cl.
*G06T 7/50* (2017.01)
*G06V 10/26* (2022.01)
*G06V 10/56* (2022.01)
*G06V 10/764* (2022.01)
*G06V 20/58* (2022.01)

(52) U.S. Cl.
CPC ............ *G06V 10/56* (2022.01); *G06V 10/764* (2022.01); *G06V 20/584* (2022.01); *B60W 2420/403* (2013.01); *B60W 2554/404* (2020.02); *B60W 2555/60* (2020.02); *G06T 2207/30252* (2013.01); *G06V 2201/08* (2022.01)

(58) Field of Classification Search
CPC ............... G06V 10/764; G06V 20/584; G06V 2201/08; G06V 10/82
USPC .......................................................... 701/96
See application file for complete search history.

(56) References Cited

U.S. PATENT DOCUMENTS

| | | | |
|---|---|---|---|
| 2020/0160072 A1* | 5/2020 | Slater | G06T 7/20 |
| 2020/0167574 A1* | 5/2020 | Kumano | G08G 1/167 |
| 2021/0001856 A1* | 1/2021 | Miura | B60W 50/087 |
| 2023/0202474 A1* | 6/2023 | Lee | B60W 30/143 |
| | | | 701/96 |

* cited by examiner

TRAFFIC LIGHT RECOGNITION-BASED SCC CONTROL APPARATUS AND METHOD

CROSS-REFERENCE TO RELATED APPLICATION

This application claims priority from and the benefit of Korean Patent Application No. 10-2021-0188621, filed on Dec. 27, 2021, which is hereby incorporated by reference for all purposes as if set forth herein.

BACKGROUND

Field

Exemplary embodiments of the present disclosure relates to a traffic light recognition-based SCC control apparatus and method, and more particularly, to a traffic light recognition-based smart cruise control (SCC) control apparatus and method capable of recognizing a distance to a traffic light based on a front-side image off a vehicle and controlling an optimal SCC speed in a situation where there are multiple traffic lights.

Discussion of the Background

In general, when driving a vehicle, although it is important to understand the surrounding situation, that is, the surrounding situation for a road, surrounding vehicles, or pedestrians, most of all, it is very important to check the state of a traffic light indicating the driving directions of vehicles. This is because a driver may see off traffic lights for a moment or fail to recognize traffic lights accurately and promptly, which may result in a traffic accident and cause serious damage to not only vehicles but also people.

Traffic lights efficiently control a flow of traffic by providing information about the movements and directions of vehicles. A driver recognizes the traffic light state and controls a vehicle. Therefore, an autonomous driving controller provided to help a driver's driving operation also needs a technique to recognize the image-based traffic light state. Accordingly, a technique for recognizing a traffic signal currently displayed on a traffic light using an image obtained from a camera mounted on a vehicle has been provided. This technique can determine the traffic signal as a recognition matter in case only a single traffic light is visible in the obtained camera image.

However, as illustrated in FIG. 1, in a situation where the intersection and the crosswalk are continuous, it is necessary to determine which signal is an intersection signal and which signal is a crosswalk signal. As for a general smart cruise control (SCC) signal, when there is no leading vehicle at the intersection, if the current signal is green, acceleration is performed even if the next traffic light signal is a stop signal, so deceleration control is performed after the acceleration. If only a single traffic light is visible in the camera image, the signal can be determined as a recognition matter, but in the downtown area, multiple traffic lights appear in one camera image. A typical SCC system accelerates up to a target speed if there is no leading vehicle, without considering traffic lights or by using only the current signal even if traffic lights are taken into account. Therefore, when there are continuous traffic lights in the congested downtown area, the acceleration operation is performed without considering a long-distance stop signal, which causes disadvantages in that riding comfort deteriorates and fuel efficiency is lowered due to the deceleration operation by a braking device after the acceleration.

The Background of the present disclosure is disclosed in Korean Patent No. 10-1743389 (published on Jun. 7, 2017)

SUMMARY

Various embodiments are directed to a traffic light recognition-based smart cruise control (SCC) control apparatus and method capable of recognizing a distance to a traffic light based on a front-side image of a vehicle and controlling an optimal SCC speed in a situation where there are multiple traffic lights.

The problem to be solved by the present disclosure is not limited to the problem(s) mentioned above, and other problem(s) not mentioned will be clearly understood by those skilled in the art from the following description.

In an embodiment, a traffic light recognition-based smart cruise control (SCC) control apparatus includes: an image-capturing unit configured to capture a front-side image of a vehicle; and a controller configured to classify at least one traffic light in the front-side image, calculate a distance to each classified traffic light, if there are a plurality of traffic lights having different distances in the front-side image, recognize a first signal of a first traffic light closest to the vehicle and a second signal of a second traffic light located next to the first traffic light, if the first signal is a driving signal and the second signal is a stop signal, calculate an acceleration time, and control the vehicle to be accelerated and traveled during the acceleration time, and then stopped before the second traffic light by using frictional force.

The controller may be configured to classify the at least one traffic light by applying a semantic segmentation network to the front-side image, and identify signal color of the classified traffic light.

The controller may be configured to calculate the distance to the traffic light by using minimum and maximum pixel positions in a vertical direction of the traffic light.

The controller may be configured to recognize the first signal of the first traffic light and the second signal of the second traffic light on the basis of the signal color of the traffic light.

If the first signal is the driving signal and the second signal is the stop signal, the controller may be configured to determine whether an acceleration mode set by a user is adaptive, and calculate the acceleration time using an acceleration value set by the user or an acceleration value of a neighboring vehicle according to the determination result.

If the acceleration mode is not adaptive, the controller may be configured to calculate the acceleration time on the basis of at least one of an initial acceleration value set by the user, a distance between the first and second traffic lights, a gravitational acceleration, and a coefficient of friction.

If the acceleration mode is adaptive, the controller may be configured to determine whether a vehicle in a neighboring lane is able to be recognized through a sensor unit provided in the vehicle, obtain an acceleration value from the vehicle in the neighboring lane when the vehicle in the neighboring lane is able to be recognized, and calculate the acceleration time on the basis of at least one of the acceleration value obtained from the vehicle in the neighboring lane, the distance between the first traffic light and the second traffic light, the gravitational acceleration, and the coefficient of friction.

If the vehicle in the neighboring lane cannot be recognized by the sensor unit, the controller may be configured to calculate the acceleration time on the basis of at least one of the initial acceleration value set by the user, the distance between the first and second traffic lights, the gravitational acceleration, and the coefficient of friction.

The controller may be configured to perform a control operation that drives and accelerates the vehicle to the acceleration value set by the user or the acceleration value of the vehicle in the neighboring lane during the acceleration time, and after the acceleration time is over, stops the vehicle before the second traffic light by using frictional force.

In an embodiment, a traffic light recognition-based smart cruise control (SCC) control method includes: obtaining, by a controller, a front-side image of a vehicle through an image-capturing unit; classifying, by the controller, at least one traffic light in the front-side image; calculating, by the controller, a distance to each classified traffic light; if there are a plurality of traffic lights having different distances in the front-side image, recognizing, by the controller, a first signal of a first traffic light closest to the vehicle and a second signal of a second traffic light located next to the first traffic light; if the first signal is a driving signal and the second signal is a stop signal, calculating, by the controller, an acceleration time; and controlling, by the controller, the vehicle to be accelerated and traveled during the acceleration time, and then stopped before the second traffic light by using frictional force.

In the classifying step, the controller may be configured to classify the at least one traffic light by applying a semantic segmentation network to the front-side image, and identify signal color of the classified traffic light.

In the distance-calculating step, the controller may be configured to calculate the distance to the traffic light by using minimum and maximum pixel positions in a vertical direction of the traffic light.

In the recognizing step, the controller may be configured to recognize the first signal of the first traffic light and the second signal of the second traffic light on the basis of the signal color of the traffic light.

In the acceleration time-calculating step, if the first signal is the driving signal and the second signal is the stop signal, the controller may be configured to determine whether an acceleration mode set by a user is adaptive, and calculate the acceleration time using an acceleration value set by the user or an acceleration value of a neighboring vehicle according to the determination result.

In the acceleration time-calculating step, if the acceleration mode is not adaptive, the controller may be configured to calculate the acceleration time on the basis of at least one of an initial acceleration value set by the user, a distance between the first and second traffic lights, a gravitational acceleration, and a coefficient of friction.

In the acceleration time-calculating step, if the acceleration mode is adaptive, the controller may be configured to determine whether a vehicle in a neighboring lane is able to be recognized through a sensor unit provided in the vehicle, obtain an acceleration value from the vehicle in the neighboring lane when the vehicle in the neighboring lane is able to be recognized, and calculate the acceleration time on the basis of at least one of the acceleration value obtained from the vehicle in the neighboring lane, the distance between the first traffic light and the second traffic light, the gravitational acceleration, and the coefficient of friction.

In the acceleration time-calculating step, if the vehicle in the neighboring lane cannot be recognized by the sensor unit, the controller may be configured to calculate the acceleration time on the basis of at least one of the initial acceleration value set by the user, the distance between the first and second traffic lights, the gravitational acceleration, and the coefficient of friction.

In the controlling step, the controller may be configured to accelerate and travel the vehicle to the acceleration value set by the user or the acceleration value of the vehicle in the neighboring lane during the acceleration time, and after the acceleration time is over, stop the vehicle before the second traffic light by using frictional force.

The traffic light recognition-based SCC control apparatus and method according to aspects of the present disclosure can recognize the distance to a traffic light and enable optimal SCC speed control in consideration of even long-distance signals by using a front camera, thereby improving riding comfort and fuel economy. Therefore, the traffic light recognition-based SCC control apparatus and method can implement an SCC system that can be driven optimally even in a congested downtown area, and thus can be applied to the autonomous driving LV4 system to improve fuel efficiency/electric range efficiency and driving convenience.

The effects of the present disclosure are not limited to the above-mentioned effects, and various effects may be included within the range apparent to those skilled in the art from the description below.

DETAILED DESCRIPTION OF THE ILLUSTRATED EMBODIMENTS

Figure 1:
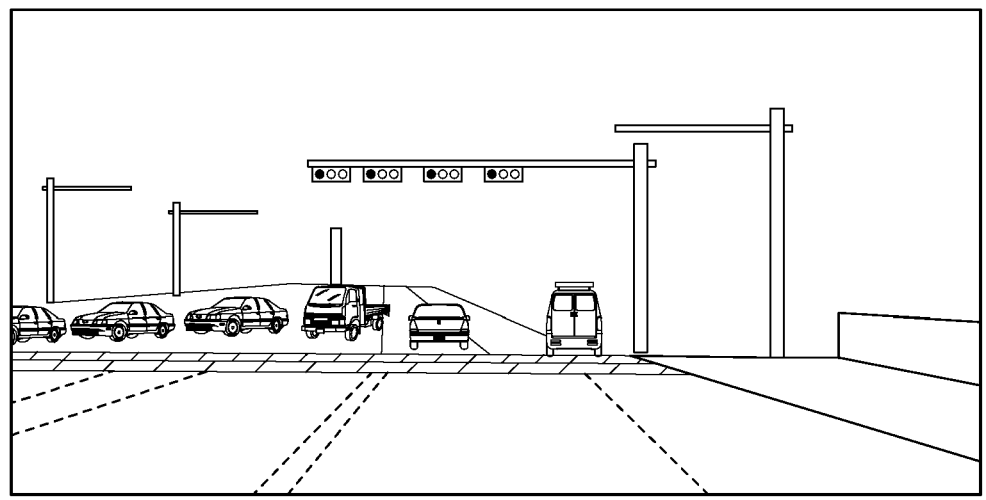
FIG. 1 is an exemplary diagram illustrating multiple traffic lights in which an intersection and crosswalks are continuous.

Hereinafter, a traffic light recognition-based smart cruise control (SCC) control apparatus and method according to an embodiment of the present disclosure will be described below with reference to the accompanying drawings through exemplary embodiments. In the description, the thickness of the lines or the size of the components illustrated in the drawings may be exaggerated for clarity and convenience of explanation. In addition, the terms to be described later are terms defined in consideration of functions thereof in the present disclosure, which may vary according to the user or operator's intention or practices in the art. Therefore, definitions of these terms should be made based on the content throughout this specification.

Implementations described herein may be implemented in, for example, a method or process, a device, a software program, a data stream, or a signal. Although discussed only in the context of a single form of implementation (e.g., discussed only as a method), implementations of the discussed features may also be implemented in other forms (e.g., as a device or program). The device may be implemented as suitable hardware, software, firmware, or the like. A method may be implemented by a device such as a processor, which generally refers to a processing device, including, for example, a computer, a microprocessor, an integrated circuit or programmable logic device, or the like.

Figure 2:
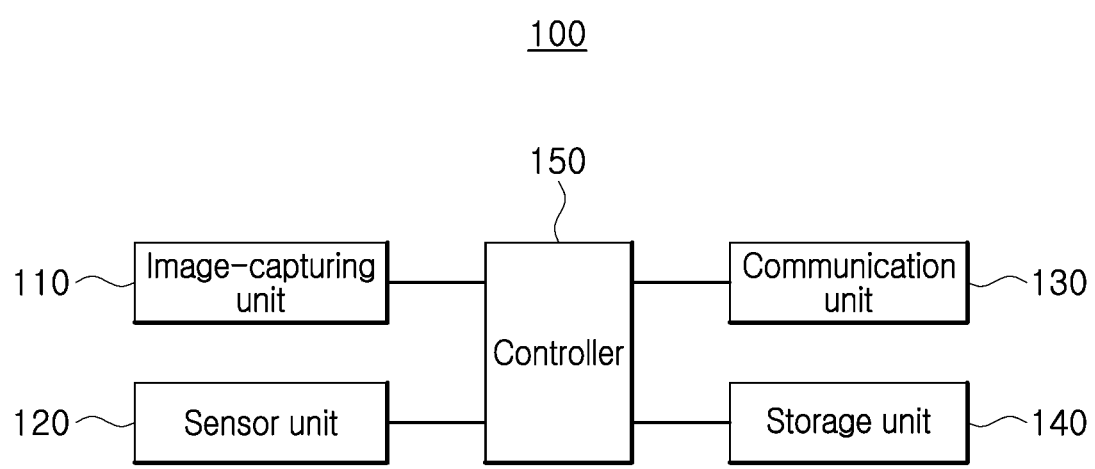
FIG. 2 is block diagram schematically illustrating a traffic light recognition-based smart cruise control (SCC) control apparatus according to an embodiment of the present disclosure.
Figure 3A:
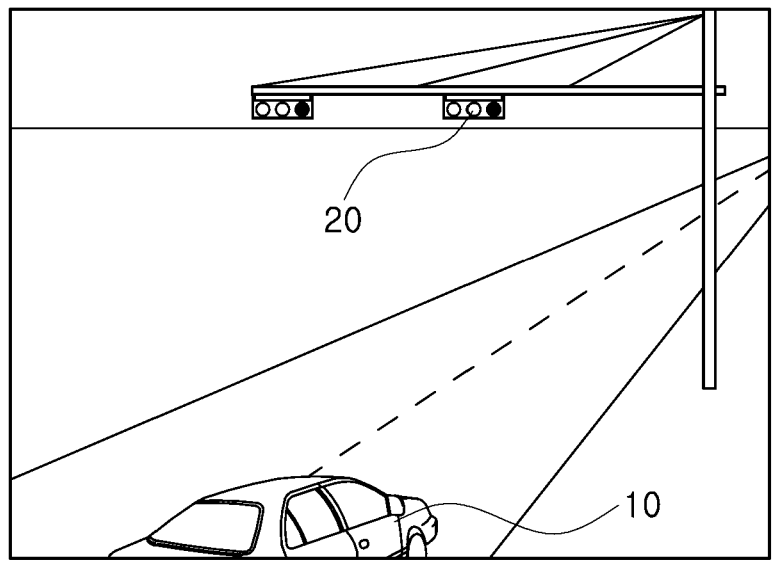
FIGS. 3A-3C are exemplary diagrams illustrating a method of recognizing a traffic light area using a semantic segmentation network according to an embodiment of the present disclosure.
Figure 3B:
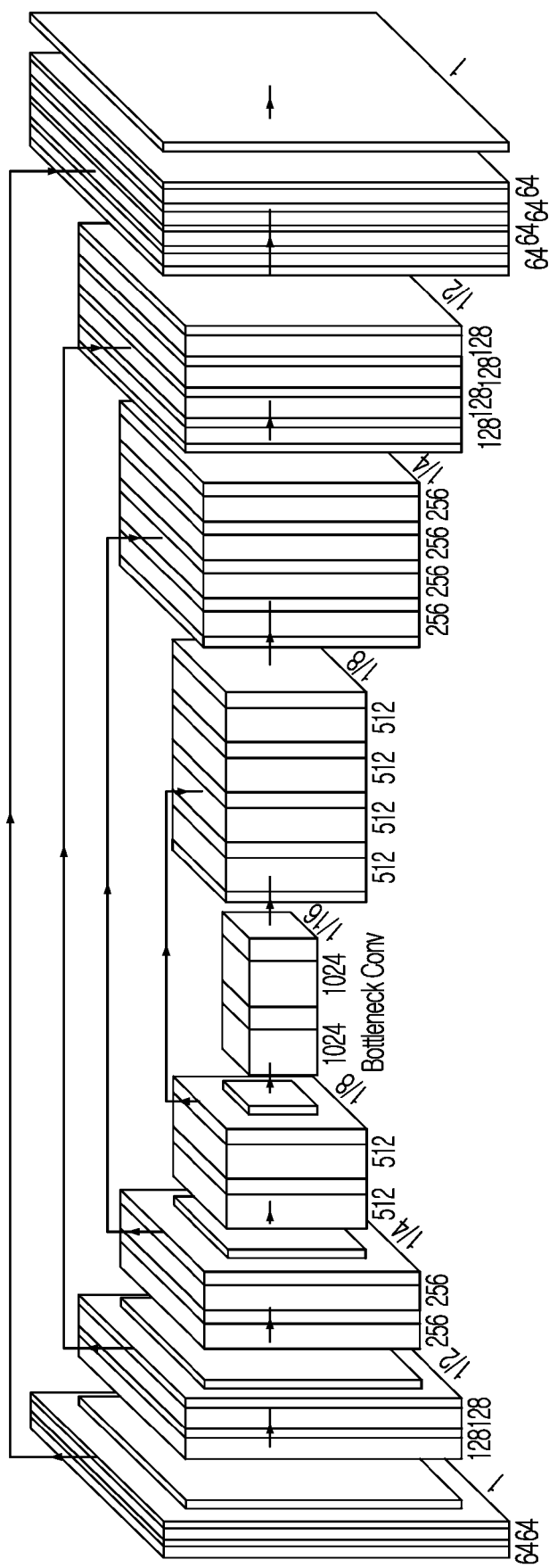
Figure 3C:
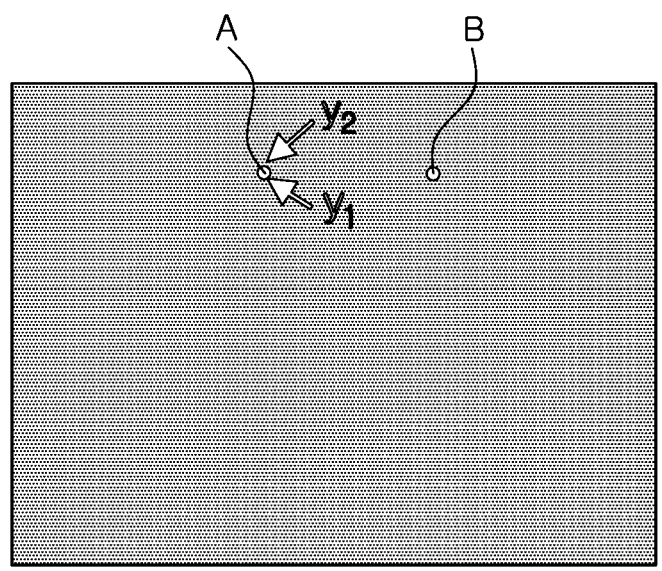
Figure 4:
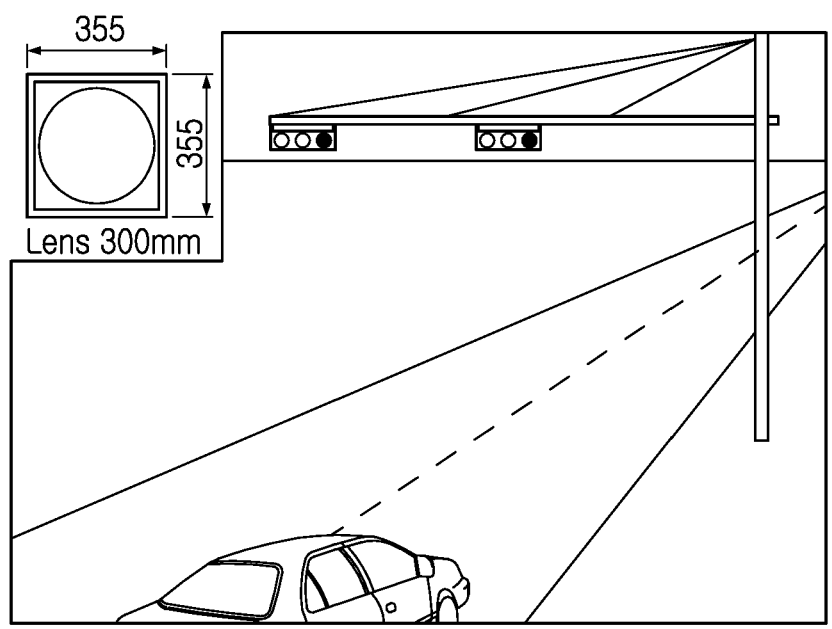
FIG. 4 is an exemplary diagram illustrating a traffic light and the size of a lens thereof according to an embodiment of the present disclosure.
Figure 5:
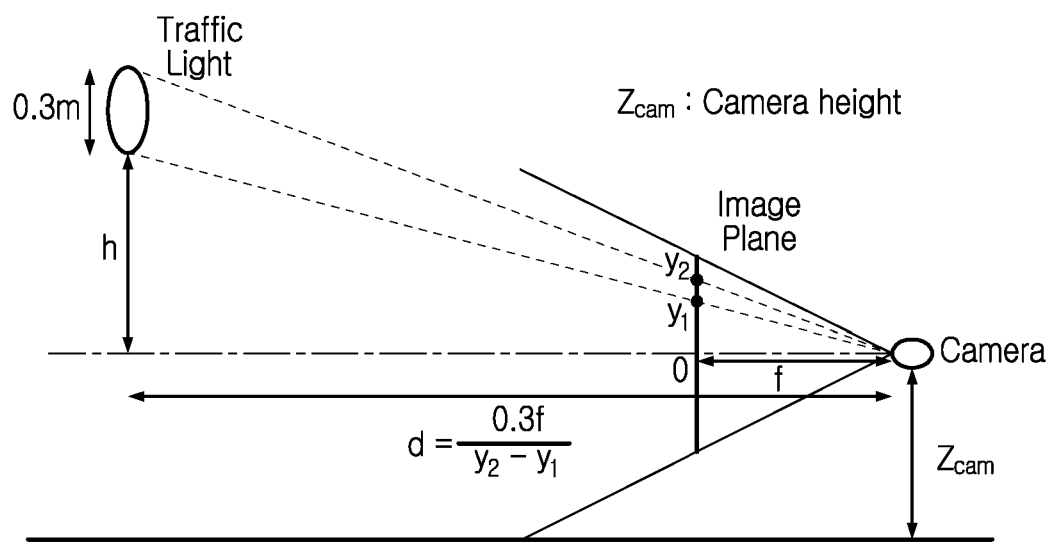
FIG. 5 is a diagram illustrating a geometric model of a camera and a traffic light position according to an embodiment of the present disclosure.
Figure 6:
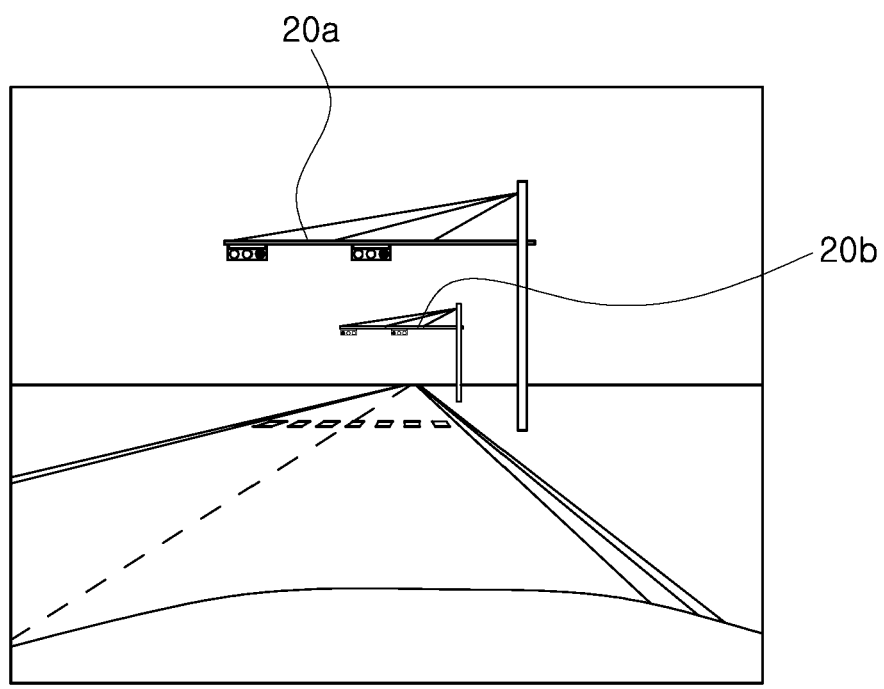
FIG. 6 is an exemplary diagram illustrating a multi-traffic light environment according to an embodiment of the present disclosure.
Figure 7:
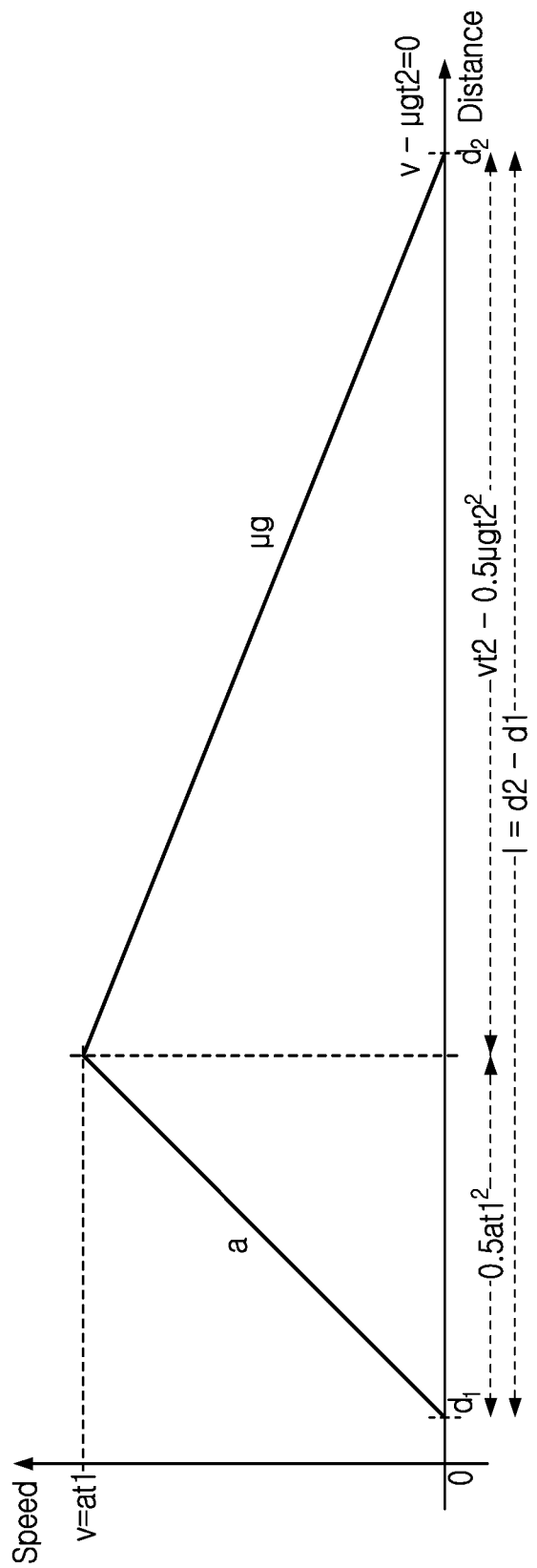
FIG. 7 is a diagram illustrating SCC speed control in the multi-traffic light environment according to an embodiment of the present disclosure.

FIG. 2 is block diagram schematically illustrating a traffic light recognition-based smart cruise control (SCC) control apparatus 100 according to an embodiment of the present disclosure, FIGS. 3A-3C are exemplary diagrams illustrating a method of recognizing a traffic light area using a semantic segmentation network according to an embodiment of the present disclosure, FIG. 4 is an exemplary diagram illustrating a traffic light and the size of a lens thereof according to an embodiment of the present disclosure, FIG. 5 is a diagram illustrating a geometric model of a camera and a traffic light position according to an embodiment of the present disclosure, FIG. 6 is an exemplary diagram illustrating a multi-traffic light environment according to an embodiment of the present disclosure, and FIG. 7 is a diagram illustrating SCC speed control in the multi-traffic light environment according to an embodiment of the present disclosure.

Referring to FIG. 2, the traffic light recognition-based SCC control apparatus 100 according to an embodiment of the present disclosure includes an image-capturing unit 110, a sensor unit 120, a communication unit 130, a storage unit 140, and a controller 150.

The image-capturing unit 110 is installed on any one or more of the front, rear, and side of a vehicle 10 to obtain an image. In this embodiment, an example in which the image-capturing unit 110 is installed on the front side of the vehicle 10 to obtain a front-side image will be described. The image-capturing unit 110 may be implemented as any one of image sensors such as a charge coupled device (CCD) image sensor, a complementary metal oxide semi-conductor (CMOS) image sensor, a charge priming device (CPD) image sensor, a charge injection device (CID) image sensor, or the like.

The sensor unit 120 may detect an object existing outside the vehicle 10, and provide the detection result to the controller 150. Here, examples of the object may include various objects relevant to the operation of the vehicle 10, such as lanes, other vehicles, pedestrians, two-wheeled vehicles, traffic signals, roads, structures, speed bumps, topographical features, animals, and the like.

The sensor unit 120 is a sensor capable of detecting a direction, a distance, and a size of an object in front of a vehicle, and examples thereof may include a camera, a light imaging detection and ranging (LIDAR), an ultrasonic sensor, and a radio detection and ranging (RADAR), and an infrared sensor. According to an embodiment, the sensor unit 120 may further include other components in addition to the described components, or may not include some of the described components.

The storage unit 140 is configured to store data relevant to the operation of the apparatus 100. Here, the storage unit 140 may use a known storage medium, for example, any one or more of known storage media such as ROM, PROM, EPROM, EEPROM, RAM, and the like. In particular, a traffic light recognition-based SCC control program (application or applet) may be stored in the storage unit 140, and the stored information may be selected by the controller 150 as necessary.

The communication unit 130 is configured for communication with a surrounding vehicle, and may transmit/receive driving state information of the surrounding vehicle. Here, the driving state information of the surrounding vehicle may include state information of the surrounding vehicle (including driving information, driving mode, speed, acceleration, etc. of the surrounding vehicle), surrounding recognition information (including road information, weather information, etc.), and the like. The communication unit 130 may be, for example, a vehicle to everything (V2X) communication unit 130. V2X communication is a generic term for communication technology with the vehicle 10 through all interfaces, and may have a vehicle to vehicle (V2V) form, a vehicle to infrastructure (V2I) form, or the like. For example, the communication unit 130 may perform the V2X communication with a front/rear vehicle on the front/rear side of the vehicle 10, and a vehicle in a neighboring lane. In particular, the communication unit 130 may receive an acceleration value or the like of the surrounding vehicle and provide the same to the controller 150.

The controller 150 may be configured to: classify at least one traffic light in the front-side image captured by the image-capturing unit 110; calculate a distance to each of classified traffic lights; if there are a plurality of traffic lights with different distances in the front-side image, recognize a first signal of a first traffic light 20a closest to the vehicle 10 and a second signal of a second traffic light 20b located next to the first traffic light 20a; if the first signal is a driving signal and the second signal is a stop signal, calculate an acceleration time; and control the vehicle to be accelerated and driven for the acceleration time, and then stopped before the second traffic light 20b with frictional force.

Specifically, the controller 150 may be configured to classify at least one traffic light by applying a semantic segmentation network to the front-side image, and identify the signal color of each classified traffic light. The image segmentation network is a network that performs classifying objects for respective pixels to show which object a corresponding pixel belongs to so that area segmentation is performed for each object, rather than dividing the foreground and background or grouping pixels with similar characteristics. That is, according to the image segmentation network, it is possible to know a position where an object in an image exists.

The controller 150 may classify the traffic light area in the front-side image in units of pixels using a semantic segmentation network (e.g., UNet). Then, the controller 150 may identify a red signal area, a yellow signal area, and a green signal area.

For example, when the semantic segmentation network as illustrated in FIG. 3B is applied to the front-side image as illustrated in FIG. 3A, the controller 150 may identify the traffic light areas as illustrated with A and B in FIG. 3C.

As described above, the controller 150 may distinguish traffic light pixels in the front-side image by using the semantic segmentation network.

When the traffic light areas are identified, the controller 150 may calculate distances to respective traffic lights by using the minimum/maximum pixel positions in the vertical direction of the traffic light. In this case, the controller 150 may calculate the distance using the physical size and geometric relationship of the traffic light.

Since a general traffic light needs to be installed only at a height of 450 cm or higher, the height is not a fixed height. However, since the size of a lens of the traffic light is determined as 355*355 as illustrated in FIG. 4, the distance to the traffic light may be obtained using this feature. When the traffic light is in the front of a vehicle, the cross-sectional view in the vertical direction is as illustrated in FIG. 5. When an intrinsic parameter of a camera 110, for example, a focal length (f) of the camera, a pixel size) is obtained through a calibration process, assuming that a starting point and an ending point of the traffic light appearing on the image in the vertical direction of the camera are y1 and y2 as illustrated in FIG. 5, Equation 1 below should be satisfied according to a proportional relationship.

$$f:y_1=d:h$$

$$f:y_2=d:h+0.3 \quad \text{Equation 1}$$

If Equation 1 is arranged as a relational expression for d, Equation 2 below can be obtained. The controller 150 may calculate the distance from the image-capturing unit 110 to the traffic light by using Equation 2 below.

$$d = \frac{0.3f}{y_2 - y_1} \quad \text{Equation 2}$$

Here, d is a distance from the image-capturing unit 110 to the traffic light, and f is a focal length of the image-capturing unit (camera, 110). The camera focal length may be a value obtained through intrinsic calibration in the manufacture of the vehicle 10.

The controller 150 may obtain the distance from the image-capturing unit 110 to the traffic light using Equation 2 by grouping the pixels classified into consecutive traffic light areas and obtaining the minimum/maximum pixel positions in the image height direction. In this case, the controller 150 may calculate respective distances from the image-capturing unit 110 to all the traffic lights present in the front-side image.

When the distances to the traffic lights are calculated, the controller 150 may determine whether there are multiple traffic lights having different distances in the front-side image. When there are multiple traffic lights in the front-side image, the controller 150 may recognize a first signal of a first traffic light 20a closest to the vehicle 10 and a second signal of a second traffic light 20b located next to the first traffic light 20a. In this case, the controller 150 may recognize the first signal using a first signal color of the first traffic light 20a that is the closest to the image-capturing unit 110, and the second signal using a second signal color of the second traffic light 20b that is second closest to the image-capturing unit 110. For example, when the signal color is red, the controller 150 may recognize the signal as a stop signal, and when it is green, the controller 150 may recognize the signal as a driving signal.

As a result of recognizing the first signal of the first traffic light 20a and the second signal of the second traffic light 20b, when the first signal is a driving signal and the second signal is a stop signal, the controller 150 may calculate an acceleration time by obtaining an acceleration value according to an acceleration mode set by a user. Here, the acceleration mode set by the user may be a mode set in a vehicle user setting mode (USM).

The controller 150 may determine whether the acceleration mode set by a user is adaptive, and may calculate the acceleration time using an acceleration value set by the user or an acceleration value of the surrounding vehicle according to the determination result.

When the acceleration mode is the fixed type (not the adaptive type), the controller 150 may calculate the acceleration time using an initial acceleration value set by the user. In this case, the controller 150 may calculate the acceleration time on the basis of at least one of the initial acceleration value set by the user, a distance between the first traffic light 20a and the second traffic light 20b, a gravitational acceleration, and a coefficient of friction.

For example, when traffic lights are continuously positioned as illustrated in FIG. 6, the controller 150 may perform SCC control in consideration of a distant stop signal through measurement of the distance to the traffic light using the size thereof in the front-side image. It is assumed that upon starting after stopping, the acceleration value set in the vehicle user setting mode (USM) is a, the distance to the closest first traffic light 20a is d1, and the distance to the second traffic light 20b located next to the first traffic light 20a is d2. When the first traffic light 20a indicates a driving signal and the second traffic light 20b indicates a stop signal, the vehicle 10 should stop before the second traffic light 20b after driving between the two traffic lights. Therefore, speed control as illustrated in FIG. 7 is required depending on the distance.

When the vehicle 10 is stopped only with the friction force of the vehicle 10 without a brake during deceleration, the fuel efficiency may become higher and the riding comfort of an occupant may be improved. Accordingly, the controller 150 may control the speed such that a vehicle is accelerated for an acceleration time t1 and then stopped only with friction force. Since "v−μgt$_2$=0", if the relationship between the acceleration time t1 and the stopping time t2 with only frictional force is obtained, $t_2 = at_1/\mu g$, which is substituted into a distance condition to obtain Equation 3 below.

$$l = 0.5at_1^2 + vt_2 - 0.5\mu g t_2^2 = 0.5at_1^2 + \frac{a^2}{\mu g}t_1^2 - \frac{0.5a^2}{\mu g}t_1^2 \quad \text{Equation 3}$$

Here, l may be the distance between the first traffic light 20a and the second traffic light 20b, and g may be the gravitational acceleration. μ is the coefficient of friction, which may be a constant value obtained for general roads in a design stage.

When a fixed value set in the USM is used as the acceleration value a, the acceleration time t1 for stopping only with frictional force without driving a brake after movement between two traffic lights is expressed by Equation 4 below. That is, the controller 150 may control the vehicle 10 to accelerate only during the acceleration time t1.

$$t_1 = \sqrt{2l \bigg/ \left(a + \frac{a^2}{\mu g}\right)} \quad \text{Equation 4}$$

If a speed profile is not the constant acceleration or there is an initial speed $v_s$, the controller 150 may calculate the acceleration time using Equation 5 below.

$$v_s + \int a(t_1)dt_1 - \mu g t_2 - \int a_d(t_2)dt_2 = 0 \quad \text{Equation 5}$$

As described above, when a fixed value is used as the acceleration value, the controller 150 may calculate the acceleration time on the basis of at least one of the initial acceleration value set by the user as shown in Equation 4, the distance between the first traffic light 20a and the second traffic light 20b, the gravitational acceleration, and the coefficient of friction.

In addition, when the acceleration mode set in the USM is adaptive, the controller 150 may determine whether a vehicle in a neighboring lane can be recognized through front/side radars provided in the vehicle 10, and obtain an acceleration value from the vehicle in the neighboring lane when the vehicle in the neighboring lane can be recognized. In this case, the controller 150 may receive the acceleration value from the vehicle in the neighboring lane through the communication unit 130 such as V2V or V2X. Then, the controller 150 may calculate the acceleration time on the basis of at least one of the acceleration value obtained from the vehicle in the neighboring lane, the distance between the first traffic light 20a and the second traffic light 20b, the gravitational acceleration, and the coefficient of friction. If it is not possible to recognize the vehicle in the neighboring lane through the front/side radars, the controller 150 may calculate the acceleration time on the basis of at least one of the initial acceleration value set by the user, the distance between the first traffic light 20a and the second traffic light 20b, the gravitational acceleration, and the coefficient of friction.

When the acceleration time is calculated, the controller 150 may control the vehicle to accelerate and travel during the acceleration time and then stop before the second traffic light 20b with frictional force after the acceleration time elapses.

The traffic light recognition-based SCC control apparatus 100 configured as described above may obtain distances to respective traffic lights by inputting a front-side image acquired through the image-capturing unit 110 into the semantic segmentation network to classify signal colors for respective pixels, and using the maximum/minimum positions of consecutive pixels. If consecutive traffic lights having different distances are seen in one image, the controller 150 may recognize such an environment as a multi-traffic light environment. When the first signal by the first traffic light 20a is green (driving signal), but the second signal by the second traffic light 20b is red (stop signal), the controller 150 may use a multi-traffic light-based SCC control method. The multiple traffic light-based SCC control method may be a method of controlling a vehicle to be accelerated and traveled for the acceleration time and then stopped before the second traffic light 20b with frictional force when an acceleration time elapses. In this case, if the acceleration mode set in the USM is not adaptive, the controller 150 may obtain the acceleration time t1 by using the set initial acceleration value and Equation 4. If the acceleration mode set in the USM is adaptive, the controller 150 may calculate the acceleration time t1 by using the acceleration value of the vehicle in the neighboring lane with the front/side radars. When the neighboring lane is not recognized by the front/side radars, the controller 150 may use the acceleration value set in the USM. Then, the controller 150 controls the vehicle to be accelerated and traveled to the set acceleration value only during the acceleration time t1, and then stop the acceleration and decelerate to reach the distant second traffic light 20b with the frictional force.

Figure 8:
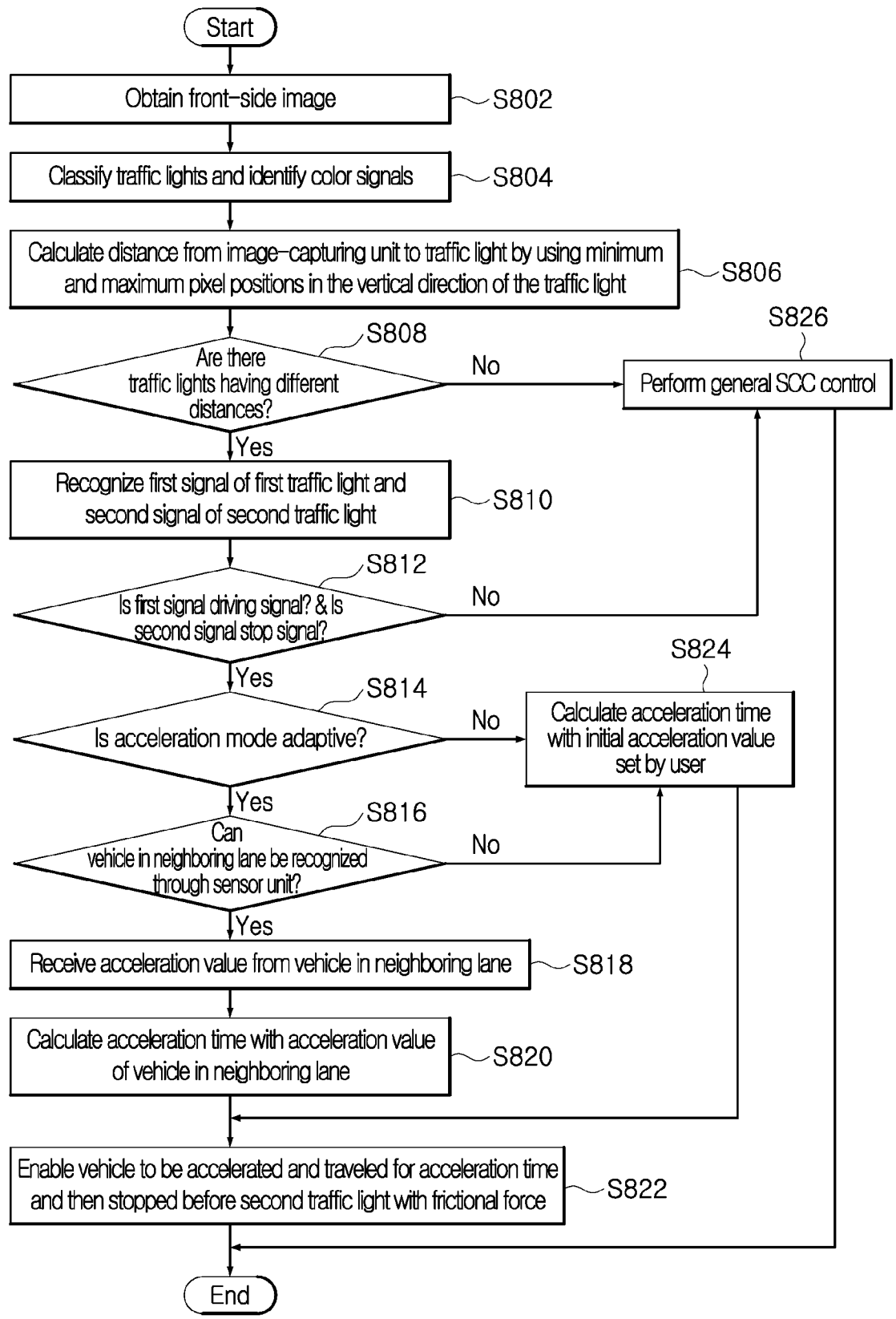
FIG. 8 is a flowchart illustrating a traffic light recognition-based SCC control method according to an embodiment of the present disclosure.

FIG. 8 is a flowchart illustrating a traffic light recognition-based SCC control method according to an embodiment of the present disclosure.

Referring to FIG. 8, the controller 150 obtains a front-side image through the image-capturing unit 110 (S802), and classifies traffic lights and identifies signal colors thereof from the obtained front-side image (S804). In this case, the controller 150 may classify at least one traffic light and identify the signal colors of respective classified traffic lights by applying the semantic segmentation network to the front-side image.

When the step S804 is performed, the controller 150 calculates a distance from the image-capturing unit 110 to the traffic light by using the minimum and maximum pixel positions in the vertical direction of the traffic light (S806). In this case, the controller 150 may calculate the distance from the image-capturing unit 110 to the traffic light by using the physical size and geometric relationship of the traffic light.

When the step S806 is performed, the controller 150 determines whether there are a plurality of traffic lights having different distances in the front-side image (S808).

As a result of the determination in the step S808, if a plurality of traffic lights having different distances exist in the front-side image, the controller 150 recognizes the first signal of the first traffic light 20a closest to the vehicle 10 and the second signal of the second traffic light 20b located next to the first traffic light 20a (S810), and determines whether the first signal is a driving signal and the second signal is a stop signal (S812). In this case, the controller 150 may recognize the first signal using the first signal color of the first traffic light 20a that is the closest to the image-capturing unit 110, and the second signal using the second signal color of the second traffic light 20b that is second closest to the image-capturing unit 110. For example, if the signal color is red, the controller 150 may recognize the signal as a stop signal, and if the signal color is green, the controller may recognize the signal as a driving signal.

As a result of the determination in the step S812, if the first signal is a driving signal and the second signal is a stop signal, the controller 150 determines whether the acceleration mode set by the user is adaptive (S814).

As a result of the determination in the step S814, if the acceleration mode is adaptive, the controller 150 determines whether a vehicle in a neighboring lane can be recognized through the sensor unit 120 provided in the vehicle 10 (S816).

As a result of the determination in the step S816, if it is possible to recognize the vehicle in the neighboring lane through the sensor unit 120, the controller 150 receives the acceleration value from the vehicle in the neighboring lane through the communication unit 130 (S818).

When the step S818 is performed, the controller 150 calculates the acceleration time on the basis of at least one of the acceleration value of the vehicle in the neighboring lane, the distance between the first traffic light 20a and the second traffic light 20b, the gravitational acceleration, and the coefficient of friction (S820).

When the step S820 is performed, the controller 150 controls a vehicle to be accelerated and traveled for the acceleration time and then stopped before the second traffic light 20b with the frictional force when the acceleration time elapses (S822). In this case, the controller 150 may control the vehicle to be accelerated and traveled to the acceleration value obtained from the surrounding vehicle during the acceleration time.

If it is determined in the step S814 that the acceleration mode is the fixed type rather than the adaptive type, the controller 150 may calculate the acceleration time using the initial acceleration value set by the user (S824), and may perform step S822. In this case, the controller 150 may calculate the acceleration time on the basis of at least one of the initial acceleration value set by the user, the distance between the first traffic light 20a and the second traffic light 20b, the gravitational acceleration, and the coefficient of friction.

As a result of the determination in the step S816, it is not possible to recognize a vehicle in a neighboring lane through the sensor unit 120, the controller 150 may perform the step S824.

If it is determined in the step S808 that the plurality of traffic lights having different distances do not exist in the front-side image, the controller 150 performs general SCC control (S826). Here, the general SCC control refers to a driving control mode in which a vehicle travels with adjustment of the speed by itself by adjusting the distance to a preceding vehicle.

As described above, the traffic light recognition-based SCC control apparatus and method according to aspects of the present disclosure can recognize the distance to a traffic light and enables optimal SCC speed control in consideration of even long-distance signals by using a front camera, thereby improving riding comfort and fuel economy. Therefore, the traffic light recognition-based SCC control apparatus and method can implement an SCC system that can be driven optimally even in a congested downtown area, and thus can be applied to the autonomous driving LV4 system to improve fuel efficiency/electric range efficiency and driving convenience.

Although the present disclosure has been described with reference to the embodiments illustrated in the drawings, this is for illustrative purposed only, and it will be appreciated by those skilled in the art to which the present technique pertains that various modifications and equivalent other embodiments may be possible therefrom. Therefore, the true technical scope of the present disclosure should be defined by the following claims.

What is claimed is:

1. A traffic light recognition-based smart cruise control (SCC) control apparatus comprises:
    an image-capturing unit configured to capture a front-side image of a vehicle; and
    a controller configured to classify at least one traffic light in the front-side image, calculate a distance to each classified traffic light, determine that there are a plurality of traffic lights having different distances in the front-side image, recognize, in response to the determining, a first signal of a first traffic light closest to the vehicle and a second signal of a second traffic light located next to the first traffic light, determine that the first signal is a driving signal and the second signal is a stop signal, calculate, in response to the second determining step, an acceleration time, and control the vehicle to be accelerated and traveled during the acceleration time, and stopped before the second traffic light by using frictional force.

2. The traffic light recognition-based SCC control apparatus of claim 1, wherein the controller is configured to classify the at least one traffic light by applying a semantic segmentation network to the front-side image, and identify signal color of the classified traffic light.

3. The traffic light recognition-based SCC control apparatus of claim 1, wherein the controller is configured to calculate the distance to the traffic light by using minimum and maximum pixel positions in a vertical direction of the traffic light.

4. The traffic light recognition-based SCC control apparatus of claim 2, wherein the controller is configured to recognize the first signal of the first traffic light and the second signal of the second traffic light based on the signal color of the traffic light.

5. The traffic light recognition-based SCC control apparatus of claim 1, wherein in response to determining that the first signal is the driving signal and the second signal is the stop signal, the controller is configured to determine whether an acceleration mode set by a user is adaptive, and calculate the acceleration time using an acceleration value set by the user or an acceleration value of a neighboring vehicle according to a result of the determination.

6. The traffic light recognition-based SCC control apparatus of claim 5, wherein in response to determining that the acceleration mode is not adaptive, the controller is configured to calculate the acceleration time based on at least one of an initial acceleration value set by the user, a distance between the first and second traffic lights, a gravitational acceleration, and a coefficient of friction.

7. The traffic light recognition-based SCC control apparatus of claim 6, wherein in response to determining that the acceleration mode is adaptive, the controller is configured to determine whether a vehicle in a neighboring lane can be recognized through a sensor unit provided in the vehicle, obtain an acceleration value from the vehicle in the neighboring lane when the vehicle in the neighboring lane can be recognized, and calculate the acceleration time based on at least one of the acceleration value obtained from the vehicle in the neighboring lane, the distance between the first traffic light and the second traffic light, the gravitational acceleration, and the coefficient of friction.

8. The traffic light recognition-based SCC control apparatus of claim 7, wherein in response to determining that the vehicle in the neighboring lane cannot be recognized by the sensor unit, the controller is configured to calculate the acceleration time based on at least one of the initial acceleration value set by the user, the distance between the first and second traffic lights, the gravitational acceleration, and the coefficient of friction.

9. The traffic light recognition-based SCC control apparatus of claim 7, wherein the controller is configured to perform a control operation that accelerates and travels the vehicle to the acceleration value set by the user or the acceleration value of the vehicle in the neighboring lane during the acceleration time, and after the acceleration time is over, stops the vehicle before the second traffic light by using frictional force.

10. A traffic light recognition-based smart cruise control (SCC) control method comprising:
    obtaining, by a controller, a front-side image of a vehicle through an image-capturing unit;
    classifying, by the controller, at least one traffic light in the front-side image;
    calculating, by the controller, a distance to each classified traffic light;
    determining that there are a plurality of traffic lights having different distances in the front-side image;
    recognizing, by the controller and in response to the determining, a first signal of a first traffic light closest to the vehicle and a second signal of a second traffic light located next to the first traffic light;
    determining that the first signal is a driving signal and the second signal is a stop signal;

calculating, by the controller and in response to the second determining step, an acceleration time; and controlling, by the controller, the vehicle to be accelerated and traveled during the acceleration time, and stopped before the second traffic light by using frictional force.

11. The traffic light recognition-based SCC control method of claim 10, wherein the controller is configured to classify the at least one traffic light by applying a semantic segmentation network to the front-side image, and identify signal color of the classified traffic light.

12. The traffic light recognition-based SCC control method of claim 10, wherein the controller is configured to calculate the distance to the traffic light by using minimum and maximum pixel positions in a vertical direction of the traffic light.

13. The traffic light recognition-based SCC control method of claim 10, wherein the controller is configured to recognize the first signal of the first traffic light and the second signal of the second traffic light based on the signal color of the traffic light.

14. The traffic light recognition-based SCC control method of claim 10, wherein in response to determining that the first signal is the driving signal and the second signal is the stop signal, the controller is configured to determine whether an acceleration mode set by a user is adaptive, and calculate the acceleration time using an acceleration value set by the user or an acceleration value of a neighboring vehicle according to a result of the determination.

15. The traffic light recognition-based SCC control method of claim 14, wherein in response to determining that the acceleration mode is not adaptive, the controller is configured to calculate the acceleration time based on at least one of an initial acceleration value set by the user, a distance between the first and second traffic lights, a gravitational acceleration, and a coefficient of friction.

16. The traffic light recognition-based SCC control method of claim 15, wherein in response to determining that the acceleration mode is adaptive, the controller is configured to determine whether a vehicle in a neighboring lane can be recognized through a sensor unit provided in the vehicle, obtain an acceleration value from the vehicle in the neighboring lane when the vehicle in the neighboring lane can be recognized, and calculate the acceleration time based on at least one of the acceleration value obtained from the vehicle in the neighboring lane, the distance between the first traffic light and the second traffic light, the gravitational acceleration, and the coefficient of friction.

17. The traffic light recognition-based SCC control method of claim 16, wherein in response to determining that the vehicle in the neighboring lane cannot be recognized by the sensor unit, the controller is configured to calculate the acceleration time on the basis of at least one of the initial acceleration value set by the user, the distance between the first and second traffic lights, the gravitational acceleration, and the coefficient of friction.

18. The traffic light recognition-based SCC control method of claim 17, wherein the controller is configured to control the vehicle to be accelerated and traveled to the acceleration value set by the user or the acceleration value of the vehicle in the neighboring lane during the acceleration time, and after the acceleration time is over, stop the vehicle before the second traffic light by using frictional force.

* * * * *